Oct. 15, 1935.  G. H. ZOUCK  2,017,086
LOCOMOTIVE POWER REVERSE GEAR
Filed April 19, 1933   2 Sheets-Sheet 1
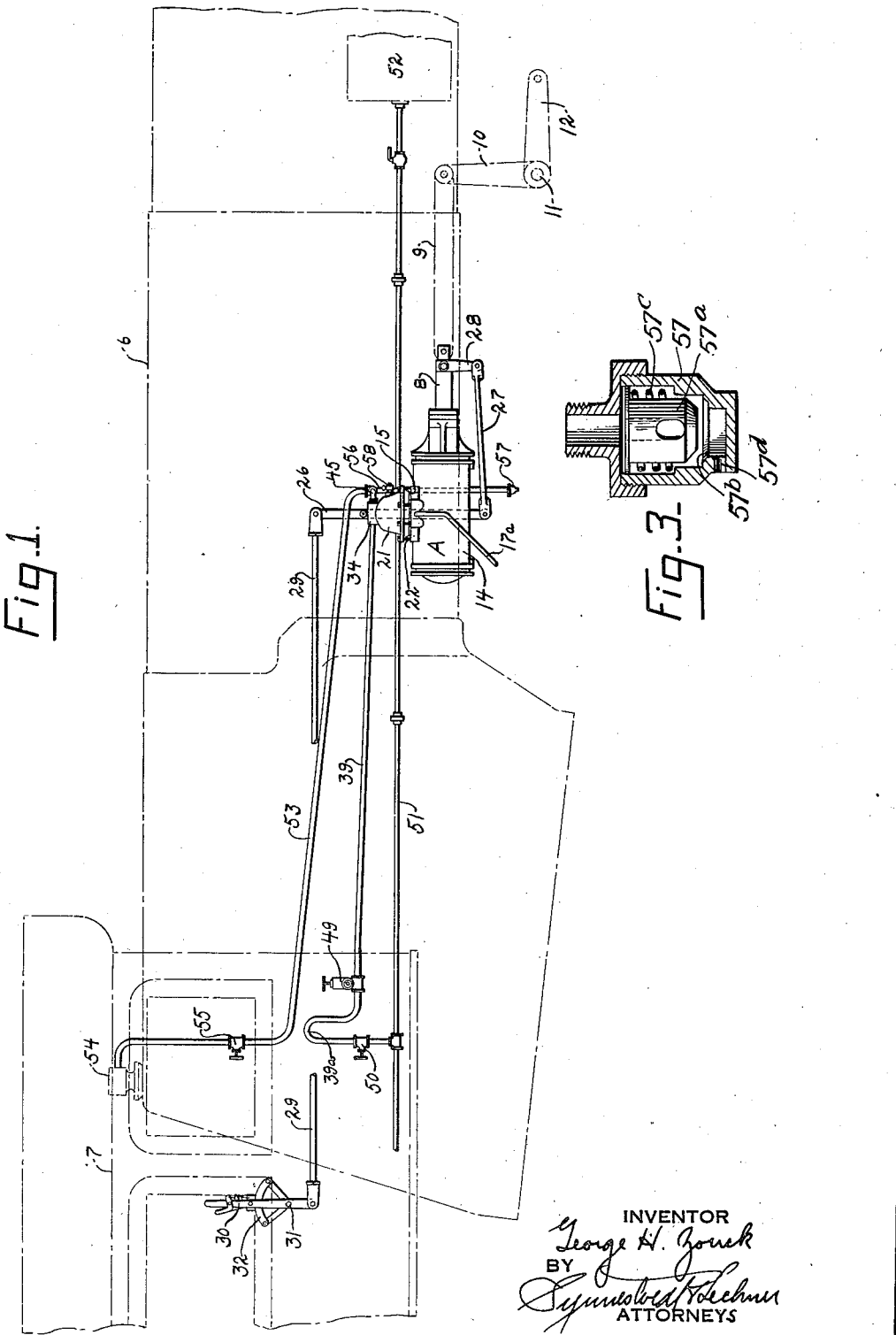

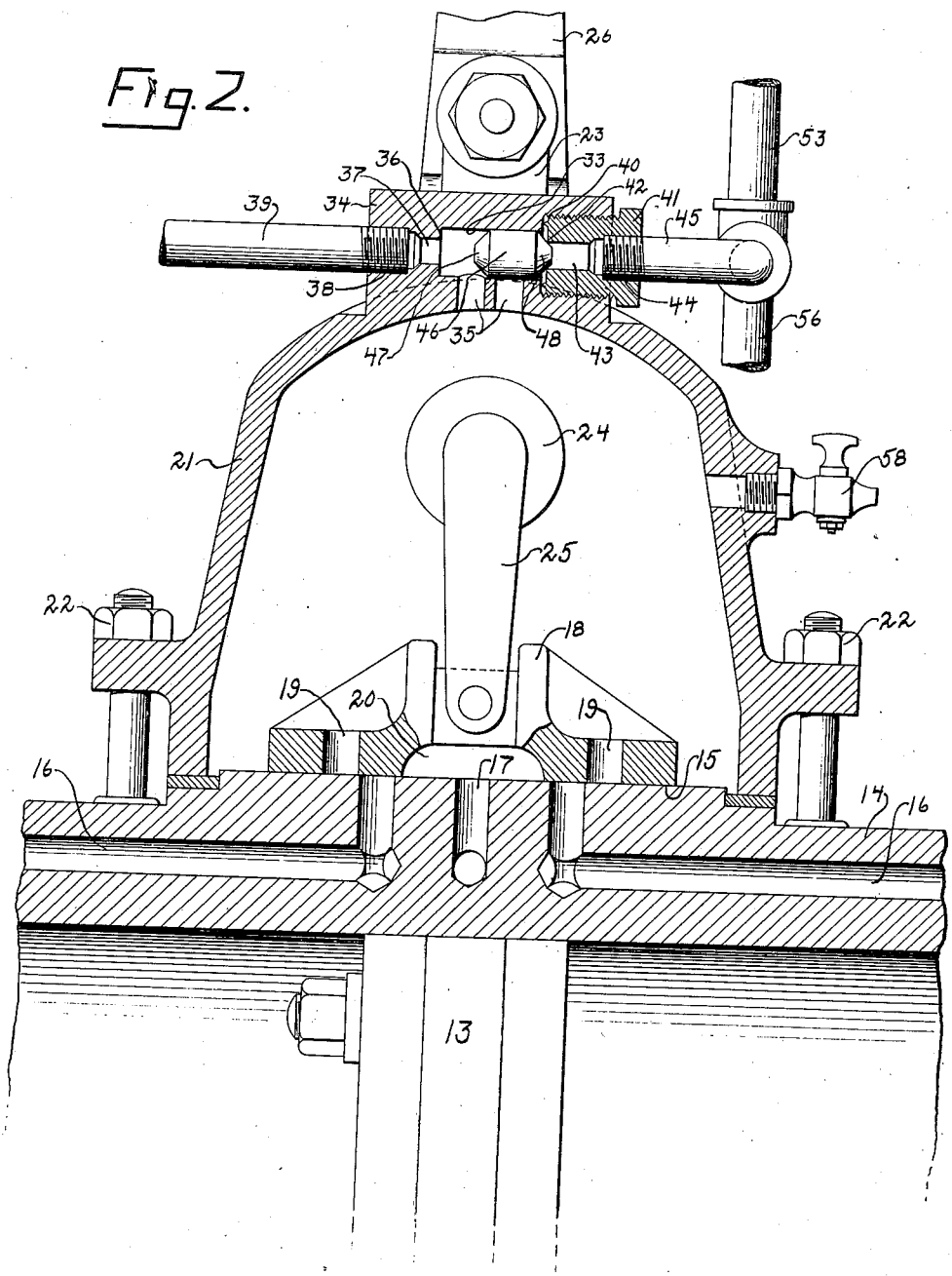

Patented Oct. 15, 1935

2,017,086

UNITED STATES PATENT OFFICE 2,017,086

LOCOMOTIVE POWER REVERSE GEAR

George H. Zouck, Orange, N. J., assignor to Franklin Railway Supply Company, New York, N. Y., a corporation of Delaware Application April 19, 1933, Serial No. 666,795

1 Claim. (Cl. 121—38)

This invention relates to power reverse gears of the fluid pressure operated type. The invention is especially concerned with a fluid pressure supply and control system for a reverse gear including two sources of fluid pressure, such as steam and air which are adapted to be used in the gear alternatively.

One of the principal objects of the invention is involved in the provision of an automatic valve mechanism associated with the gear itself for alternatively coupling the usual fluid distributing valve of the gear either with a connection extended thereto from the air source or with a connection extended thereto from the steam source.

Additionally, the invention contemplates improved means for eliminating condensate which may form from time to time in the various connections, especially the connection extended from the steam source to the gear, and improved means for maintaining atmospheric pressure in the steam line at all times during normal operation of the gear on air pressure.

Still further, the invention has in view the employment of a novel testing means in order to determine the presence or absence of fluid pressure in the pressure chamber immediately associated with the usual fluid distributing valve.

Other objects of the invention will be understood to the best advantage after a consideration of the following description of the structure itself in which reference is made to the accompanying drawings illustrating the preferred embodiment.

Figure 1 is a side elevational view of the general layout including the gear, the gear operating mechanism and the fluid pressure connections associated therewith, a portion of the locomotive to which the structure is applied being indicated in this view by dot and dash lines;

Figure 2 is a vertical sectional view of the valve mechanisms immediately associated with the gear; and Figure 3 is a sectional view of a detail.

In Figure 1 the reference numeral 6 designates the outline of a locomotive boiler and 7 indicates the outline of the cab. The gear itself, generally indicated by the letter A, of course, is employed as a servo-motor device for adjusting the setting of the valve mechanism on the locomotive. Thus the piston rod or trunk 8 of the gear is coupled as by means of link 9 with arm 10 carried by the tumbling shaft 11 which shaft also carries arm 12 which may be coupled in a well known manner with the parts of the valve gear for reversing the engine and adjusting the cut-off thereof. It will be understood, of course, that the arrangement of the connecting parts such as those indicated at 9, 10, 11 and 12 may differ in accordance with the particular type of valve mechanism with which the reverse gear is associated.

The piston 13 which is connected with the trunk or rod 8 may be moved in cylinder 14 by admitting and exhausting fluid pressure to and from opposite sides thereof in accordance with the actuation of the controlling valve mechanism. At this point it is to be observed that the present invention is applicable to power reverse gear arrangements of a variety of types including types having different main controlling valve mechanisms. However, in the present illustrative embodiment of the gear itself and main controlling valve therefor, a valve seat 15 is formed at the top of the cylinder 14 (see Figure 2), there being a pair of inlet ports 16 opening through said seat and extended to opposite ends of the cylinder. A central exhaust port 17 also opens through the seat 15 and the three ports are controlled by means of a slide valve 18 having ports 19 therein adapted to communicate with ports 16 when the valve is moved from its central position. Valve 18 also has a central exhaust cavity 20 which serves to couple one or the other of the ports 16 with the exhaust port 17 depending upon the direction of movement of the valve. The port 17 may be connected with an exhaust pipe 17a discharging to the atmosphere. A valve chest or housing 21 surrounds valve 18 and may be secured to the cylinder as by means of studs 22. Movement of the valve 18 is controlled as by means of a rocker arm 23 having a journal or bearing 24 in a side wall of the housing 21. The portion 25 of the rocker arm which is disposed inside the housing 21 is connected with the valve itself and the exterior part 23 is coupled with the combination lever 26. The lower end of the combination lever is connected as by the link 27 with a bracket or arm 28 carried on the piston trunk 8 and the upper end of this combination lever is connected with the reach rod 29 which extends rearwardly into the cab 7 of the locomotive and is, in turn, connected with the reverse lever 30 pivoted as at 31 at the base of the quadrant 32. The features of the main controlling valve and actuating mechanism therefor just referred to are not per se a part of the present invention but are briefly described in order to bring out the cooperative relationship thereof with certain elements and devices of the invention now to be referred to.

As seen most clearly in Figure 2, an additional valve device is associated with the chest 21. This valve device in the preferred arrangement includes a cylindrical cavity or bore 33 formed in an enlarged or thickened portion 34 of the chest wall at the top thereof. At this point it is to be observed that the valve cavity 33 may, of course, be formed in a separate housing or member although I prefer the integral arrangement shown in the drawings since this eliminates the necessity for making additional fluid tight connections. Under some circumstances, of course, a separate valve housing may be employed for the purpose just referred to, but it is to be observed that I contemplate an immediate association of this valve chamber with the main valve chest 21 for reasons which will appear more fully as this description proceeds.

With further reference to the valve device at the top of the chest 21, note that a pair of ports 35 serve to interconnect the interior of the chest 21 with the cavity 33 through the cylindrical wall thereof. For reasons presently to be referred to, these ports 35 are spaced from each other axially of the bore 33. At one end of the cavity 33 an internal shoulder 36 serves as a valve seat between the cavity itself and the passage 37, which latter preferably has a threaded portion 38 for the reception of pipe 39 extended to the air supply.

At the opposite end of the cavity 33 an enlarged and threaded bore 40 is provided, and this bore receives a plug device 41 having an internal shoulder 42 which serves as a valve seat between the cavity 33 and the passage 43. The member 41 is also internally threaded as at 44 to receive pipe 45 extended to the steam source.

A cylindrical shuttle valve member 46 is fitted in the cavity 33 and this valve member has tapered end portions 47 and 48 which cooperate respectively with valve seats 36 and 42 in accordance with the position of the valve. The valve member 46 is preferably made of hard bronze, although other non-oxidizing metals may be employed for the purpose, and this is desirable in ensuring free action of the valve at all times.

It is further pointed out at this time that the cylindrical portion of valve 46, as clearly shown in Figure 2, is of such length that when positioned to the right, as in this view, the right hand port 35 is completely closed and, in fact, overlapped to an appreciable extent. Stated in another way, the arrangement contemplates a relative proportioning and location of the valve 46, the chamber 33 and the ports 35—35 so that with the valve 46 positioned at either end of the cavity 33, the port 35 at that end is closed and overlapped by the cylindrical part of the valve. The discussion of the operation herebelow will bring out certain advantages of this construction.

Turning again to Figure 1, pipe 39 is provided with a lubricating device 49 and also with a shut-off valve 50, in advance of the expansion loop 39a, after which the pipe is extended for connection with the main air supply line 51 communicating with the main reservoir 52. From inspection of Figure 1 it will be noted that the pipe 39 is inclined downwardly from the lubricator 49 to the valve chest on the gear.

The steam connection 45 is coupled with pipe 53 extended to the turret 54 or other suitable source of steam and is equipped with a shut-off valve 55 which valve, as well as valve 50, is located for convenient access in the cab 7 of the locomotive. If desired, a reducing valve may be introduced in the steam line between the turret or other suitable source and the shut-off valve 55. With regard to pipe 53 it should be observed that all portions thereof beyond valve 55 are inclined downwardly to the connection 45, and further that an additional drain connection 56 communicates with this system at its low point. Thus the drain connection is extended from the steam supply pipe beyond the point of communication with the shuttle valve, and this is of importance since if it were located in advance of the communication with the shuttle valve, when steam is turned into the supply pipe, as by valve 55, the condensate formed would be carried into the shuttle valve. The drain connection 56 is further equipped with an automatic drain valve 57 of a type adapted to remain open when steam is not being employed and to close only upon the admission of a substantial quantity of steam to the line 53.

Figure 3 illustrates a valve 57 suitable for the purpose just referred to. This valve includes a plunger or the like 57a normally held off the valve seat 57b as by means of a spring 57c. An exhaust port 57d is provided below the valve seat and, as already mentioned, the valve is arranged so as to remain open when steam is not being employed and to close upon the admission of a substantial quantity of steam or pressure into the line 53.

Before considering the operation of the mechanism and the advantages flowing therefrom, attention is called to an additional structural feature which involves the use of a safety device 58 communicating with the interior of chest 21. This disposition of the device provides for testing the fluid pressure supply system to the gear at a point between the shuttle valve mechanism at the top of chest 21 and the main controlling valve 18.

In operation, air from the reservoir 52 serves as the usual and normal motive fluid for operating the gear and under normal operating conditions, therefore, valve 50 will be opened and valve 55 will be closed. The air pressure in line 39 is thus normally acting on the left end of the shuttle valve 46 over the entire piston area thereof and serves to retain this valve against the seat 42 in which position, it will be observed, only a relatively small area is exposed to any pressure which may be present in the steam supply connection. This is a result of the materially reduced cross sectional area of the passage through valve seat 42 as compared with the diameter of the cylindrical cavity 33. From inspection of the drawings it will also be observed that with the shuttle valve in the right hand position, the passage for the air through chambers 37 and 33 and the left hand port 35 are entirely free and unobstructed.

The valve gear is controlled or actuated, of course, by manipulation of the reverse lever 30 which moves the combination lever 26 in one direction or the other and thereby imparts an opposite movement to the valve 18. This, in turn, controls the admission and exhaust of air to and from opposite ends of the cylinder and upon movement of the piston and its associated trunk, the link 27 serves to return the valve to its mid position in a manner well understood in this art.

Attention is now called to four specific advantages of the arrangement of shuttle valve herein disclosed in connection with retaining the shuttle valve in position to close the connection to the steam line. In the first place, since this shuttle valve is cylindrical in form its movement is of the straight line type and its action is in the nature of a piston action which is of importance in ensuring positive operation and accurate seating. Secondly, since the steam connection 45 is normally open to the atmosphere through valve 57, even including times when leakage may occur past the steam shut-off valve 55, a differential pressure tending to maintain the steam connection closed is always assured.

In the third place, the arrangement is such that the flow of air through passage 37 and thence out through the left hand port 35 has a tendency to maintain the valve 46 in the position shown. The action of the air flow tending to move the shuttle valve to the right and to maintain this valve in the right end of cavity 33 is further enhanced by the tapered formation of the end portions of the valve itself. Thus, assuming that the valve member is in the left hand position and is just commencing movement to the right, as soon as the left hand port 35 has been cracked open, the flow of air inwardly and then downwardly aids materially in ensuring that the valve will continue its movement toward the right to close off the steam inlet side. A corresponding action will take place when the steam shut-off valve 55 is opened in order to permit operation of the gear on steam pressure. Lastly, the cylindrical portion of the valve 46 being of considerable length closes and overlaps the right hand port 35 so that no unbalancing effect can occur and, as a result of this, even if the automatic drain valve 57 were not employed or became stuck in closed position, the shuttle valve would not normally be moved from its seat.

The features just above are all of importance in ensuring closure of the steam side of the shuttle valve during normal operation. The arrangement shown has the further advantage of positively preventing entrance of steam into the air supply line 39 under any conditions. If, for some reason, the steam pressure acts to move valve 46 to the left, the piston action of this valve positively assures its movement to a position in which the left hand port 35 is closed. Thus only one or the other of the ports 35—35 can remain open at any time, and with the left hand port 35 closed whenever the right hand port 35 is open, steam can never flow from any portion of the shuttle valve mechanism into the air line 39.

If, for any reason, it is desired to operate the gear by steam pressure, the valve 55 is opened and the valve 50 is preferably, although not necessarily, closed. This permits steam to flow through the connection 53 and into the right hand end of the shuttle valve mechanism as a result of which the valve member 46 will be shifted to the left hand position and the gear can then be operated by steam. Thus, in the event of failure of the normal operating fluid, i. e., the air supply, the gear may still be employed to reverse the engine or adjust the valve gear setting.

Upon admission of steam into the connection 53, of course, the pressure thereof in the drain pipe 56 closes the automatic valve 57.

The safety device, such as the test cock or equivalent device 58, in being located in the manner referred to above and illustrated in the drawings, has several special advantages including use thereof as a means of introducing a liquid such as kerosene or other cleansing or lubricating liquid, in on top of the fluid pressure controlling valve in order to clean the valve seat or eliminate gumming or for lubrication purposes. Additionally, the location of the test cock between the shuttle valve and the main fluid controlling valve makes possible testing for pressure in the chest 21 when the gear is to be operated either on the air supply or on the steam supply. Thus, as a practical consideration, it will be noted that a workman in a round-house or shop need not climb into the cab in order to close either one or both of the shut-off valves 50 and 55 when he is working on the gear. The importance of this will appear to better advantage if it be considered that the great power of the reverse gear has heretofore caused considerable mechanical and physical damage in instances where portions of the reverse gear or the associated valve gear are being dismantled. With the present arrangement, the workman may open the device 58 whenever work is being done on the valve gear or the reverse gear itself, and an audible warning will be given in the event that either the steam line or the air line is inadvertently opened or in the event that pressure builds up as a result of a leaky valve.

Still further, it may be desirable at times to test the steam supply to the gear without actually passing any steam into the gear cylinder since the employment of steam in the gear is disadvantageous for various reasons, and is resorted to only in the event of failure of the air supply. A periodic test of the steam supply, however, is highly desirable to ensure that it will be available when desired, and this may be done by opening the test cock with the assurance that the entire steam supply system is functioning properly. In fact, this device may be employed to test every joint in the entire air supply and steam supply systems, including those immediately associated with the valve chest 21, such as indicated at 38 and 44. Finally, the location of the test cock as indicated is advantageous since it will give an indication as to whether any of the pipes in the fluid pressure supply system are clogged or frozen or leaking, or whether the shuttle valve is stuck or frozen.

Another advantage of the general layout and arrangement of piping and the like flows from the self-draining arrangement of the cavities in the shuttle valve and from the inclination of the air and steam pipes as described above. Any condensate which may form in the steam pipe as well as in the short connection 45 and the immediately associated passage 43 will drain downwardly through the pipe 56 and valve 57, this being accomplished without the danger of blowing condensate into the shuttle valve mechanism when steam is turned into the line 53 or when any appreciable leakage occurs.

The arrangement of the shuttle valve in immediate association with the valve gear itself, and preferably within a chamber formed in a part of the chest 21, ensures operation of the gear on either fluid which may be available in the event of failure of the piping for the other fluid even at the threaded connection thereof with the chest 21. This unitary or integral arrangement of the valve chambers for the main distributing valve and the shuttle valve is of further advantage since it makes possible convenient adaptation of the invention to reverse gear equipment already in service.

In accordance with the foregoing, air and steam supply connections are independently extended to the gear and in the event of failure of the air supply a change to steam may be made from the cab of the locomotive. Additionally, the arrangement positively assures that either one of the fluid supply systems may be employed, and further that steam will never be permitted to enter the air line. This latter would not only be undesirable but might, indeed, produce serious accidents as a result of the flow of steam into the air brake equipment of the locomotive and train.

I claim:—

As an article of manufacture, a valve casing member for a fluid pressure operated power reverse gear, said member having a dome-like cavity therein for the controlling valve of the gear, said member further having a cylindrical valve cavity therein adapted to receive a shuttle valve, the cylindrical cavity having its axis extended approximately tangent to the wall of the dome-like cavity and having a port at each end for connection with different sources of operating fluid for the gear, and said member having portage interconnecting the two cavities adjacent the point of approximate tangency.

GEORGE H. ZOUCK.